United States Patent [19]

Jacobson

[11] 4,156,600

[45] May 29, 1979

[54] PARTICLE SEPARATOR AND COLLECTOR

[76] Inventor: Wayne D. Jacobson, 1105 Palmer St., Owosso, Mich. 48867

[21] Appl. No.: 820,902

[22] Filed: Aug. 1, 1977

Related U.S. Application Data

[63] Continuation-in-part of Ser. No. 633,552, Nov. 19, 1975, abandoned.

[51] Int. Cl.² .................. B01D 33/04; B01D 35/12; B01D 50/00
[52] U.S. Cl. .................................. 55/285; 55/287; 55/290; 55/302; 55/317; 55/324; 55/334; 55/337; 55/430; 55/DIG. 12
[58] Field of Search .................. 55/284–288, 55/290, 293, 301–303, 317, 324, 334, 337, 341 M, 374, 400, 430, 432, 459 R, 483, 484, 521, 529, DIG. 16

[56] References Cited

U.S. PATENT DOCUMENTS

| Re. 12,174 | 11/1903 | Draver | 55/285 |
|---|---|---|---|
| Re. 13,963 | 8/1915 | Mitchell | 55/285 |
| 272,474 | 2/1883 | Prinz | 55/285 |
| 403,798 | 5/1889 | Trautmann | 55/286 |
| 699,194 | 5/1902 | Lane et al. | 55/285 |
| 711,760 | 10/1902 | Draver | 55/285 |
| 720,791 | 2/1903 | Draver | 55/285 |
| 721,360 | 2/1903 | Draver | 55/285 |
| 755,262 | 3/1904 | Walsh | 55/285 |
| 810,771 | 1/1906 | Kern, Jr. | 55/285 X |
| 1,288,614 | 12/1918 | Kern, Jr. | 55/285 |
| 2,723,726 | 11/1955 | Pellon | 55/324 X |
| 2,844,216 | 7/1958 | Swanson | 55/287 |
| 2,932,362 | 4/1960 | Roper | 55/304 X |
| 3,008,543 | 11/1961 | Bourdale et al. | 55/334 X |
| 3,045,409 | 7/1962 | Kronstad | 55/285 |
| 3,053,031 | 9/1962 | Vedder et al. | 55/304 X |
| 3,395,517 | 8/1968 | Lang et al. | 55/285 |

FOREIGN PATENT DOCUMENTS

| 54191 | 1/1938 | Denmark | 55/287 |
|---|---|---|---|
| 40122 | 1/1887 | Fed. Rep. of Germany | 55/285 |
| 1945 of | 1881 | United Kingdom | 55/286 |
| 148799 | 10/1921 | United Kingdom | 55/293 |

OTHER PUBLICATIONS

French, R. C., "Filter Media", in *Chem. Eng.*, 70(21): pp. 177–193, Oct. 14, 1963.

"M Leaders in Filter Bag Design", Mil–An Mfg. Corp., 61B Crescent St., Brooklyn, N.Y. 11208, 1-1964.

Jones, J. I., "Part I—New Polymers—Filter Cloths of the Future", in *Filtration and Separation*, 7(2): pp. 160–163, 166, 167.

*Primary Examiner*—Frank W. Lutter
*Assistant Examiner*—Kathleen J. Prunner
*Attorney, Agent, or Firm*—Ian C. McLeod

[57] ABSTRACT

An apparatus for the separation of particles from a gas of the type which has filter elements disposed around a drum located in the center of a housing with a shutter mechanism. The improvement of the present invention also relates to an apparatus which allows separation and emptying of filter elements by the shutter mechanism and particle separation without venting of particles to the atmosphere. The apparatus is particularly useful for instance, for asphalt mixing plants, stone quarry or foundry dust separation and collection.

13 Claims, 26 Drawing Figures

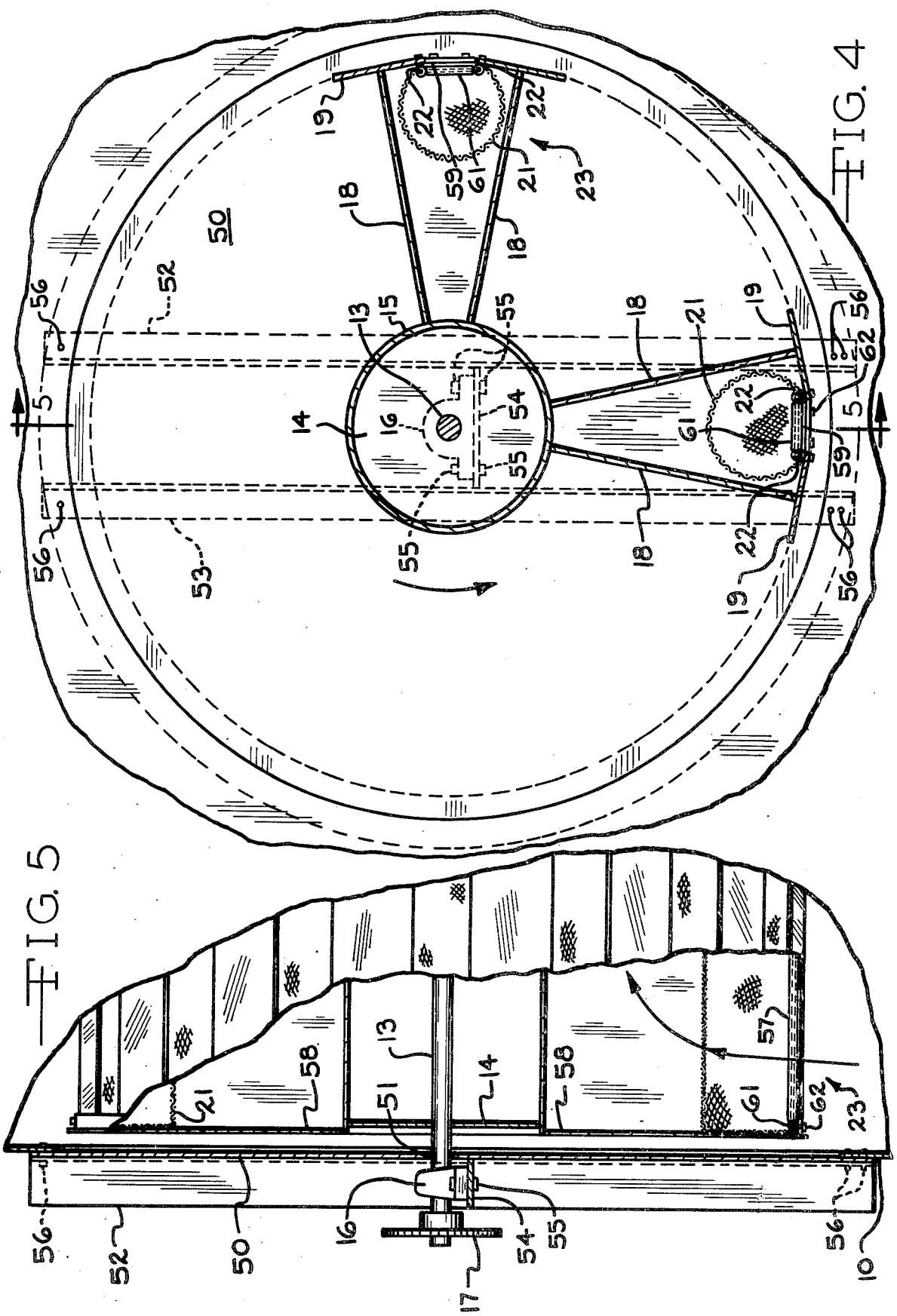

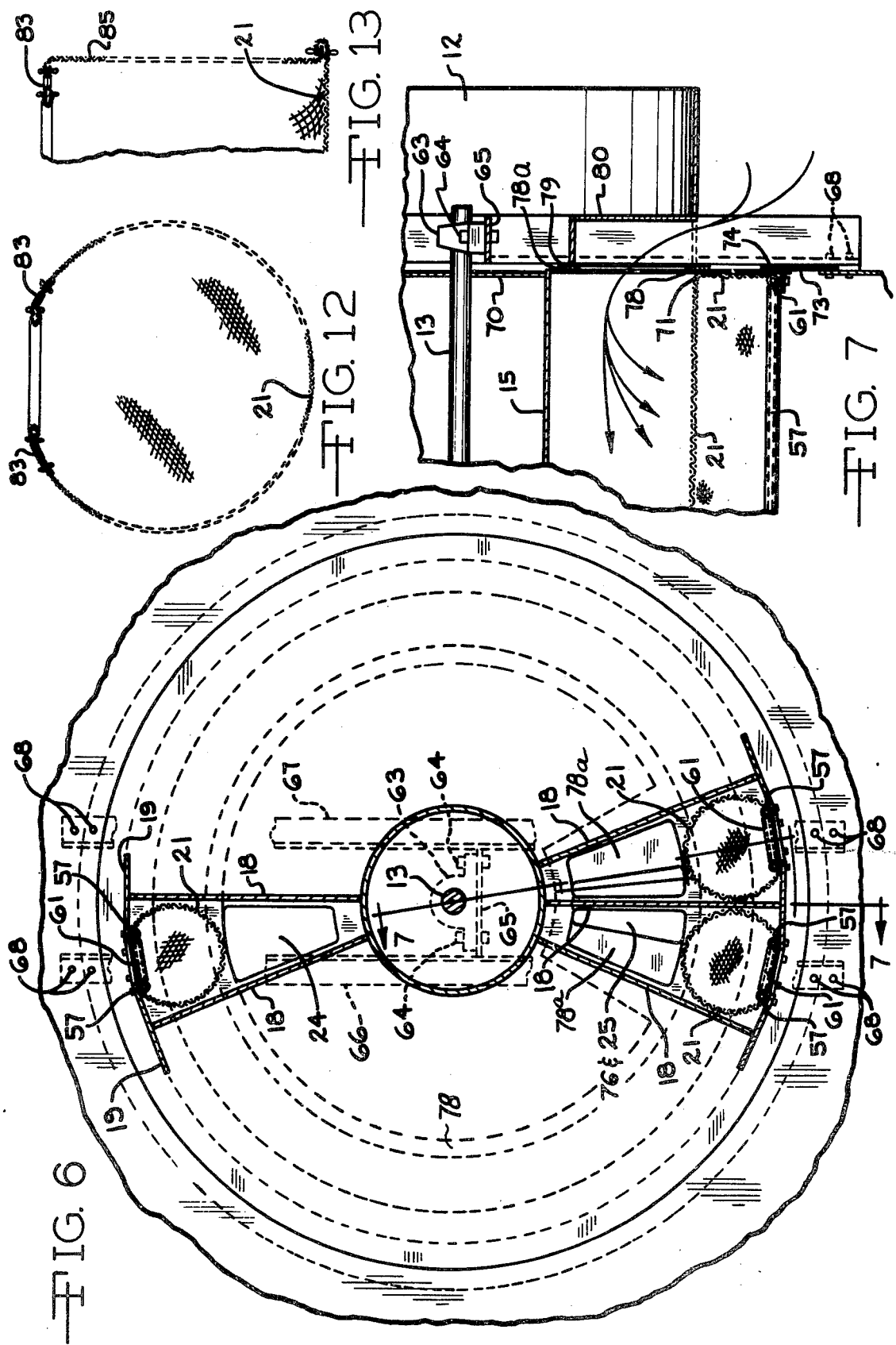

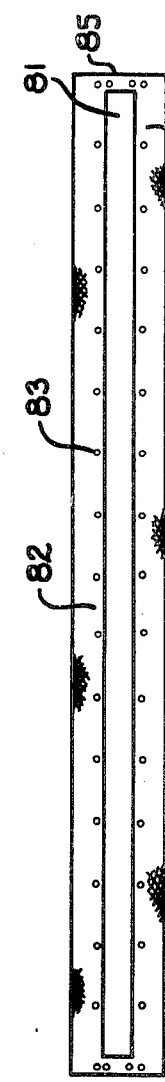
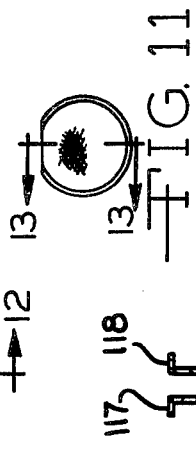
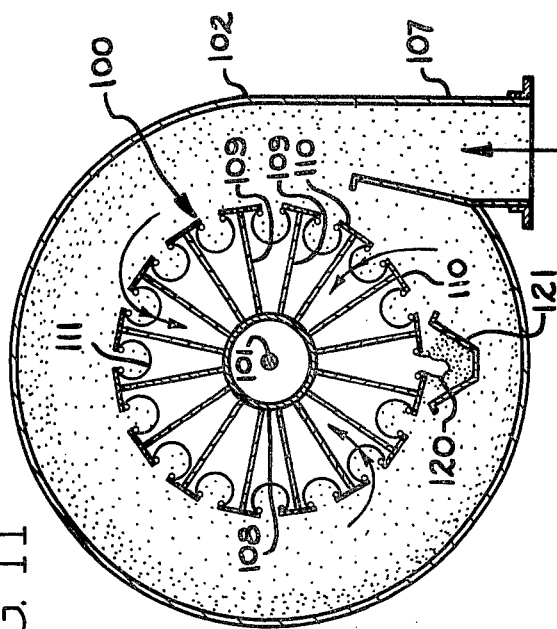
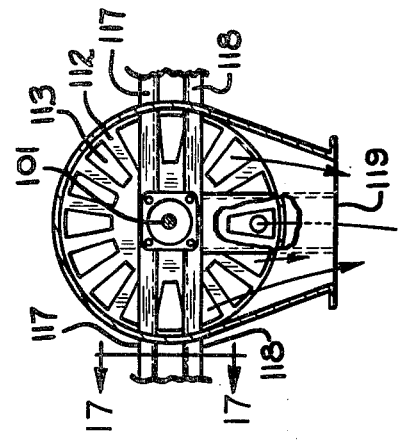
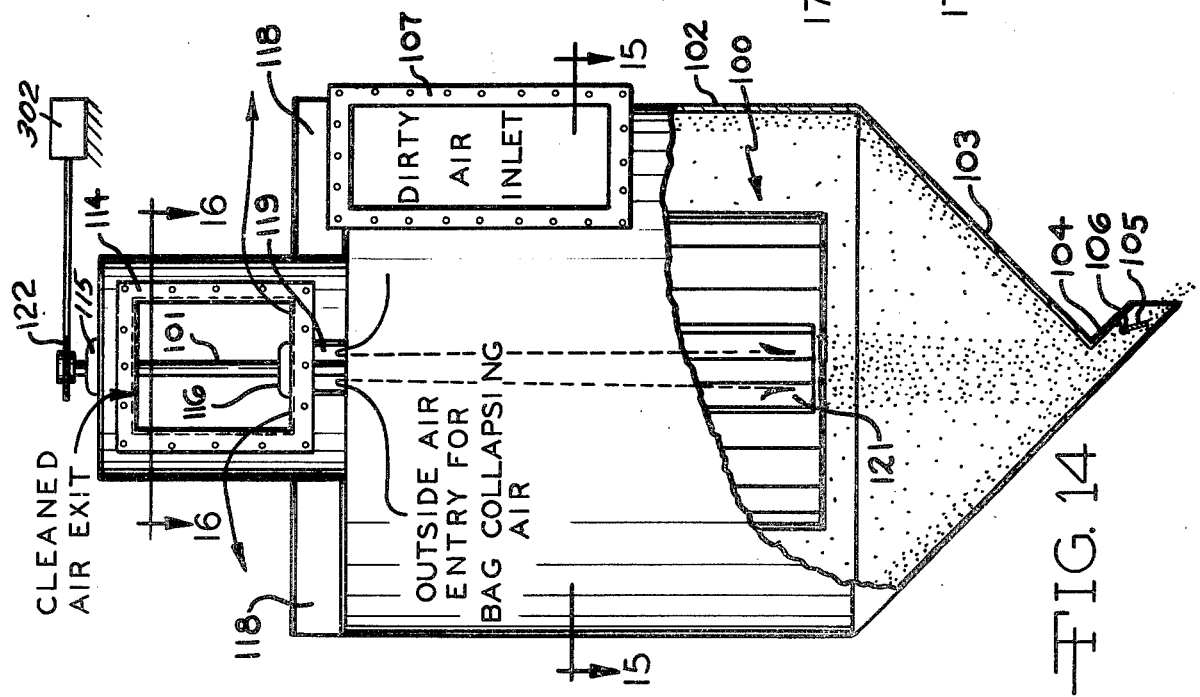

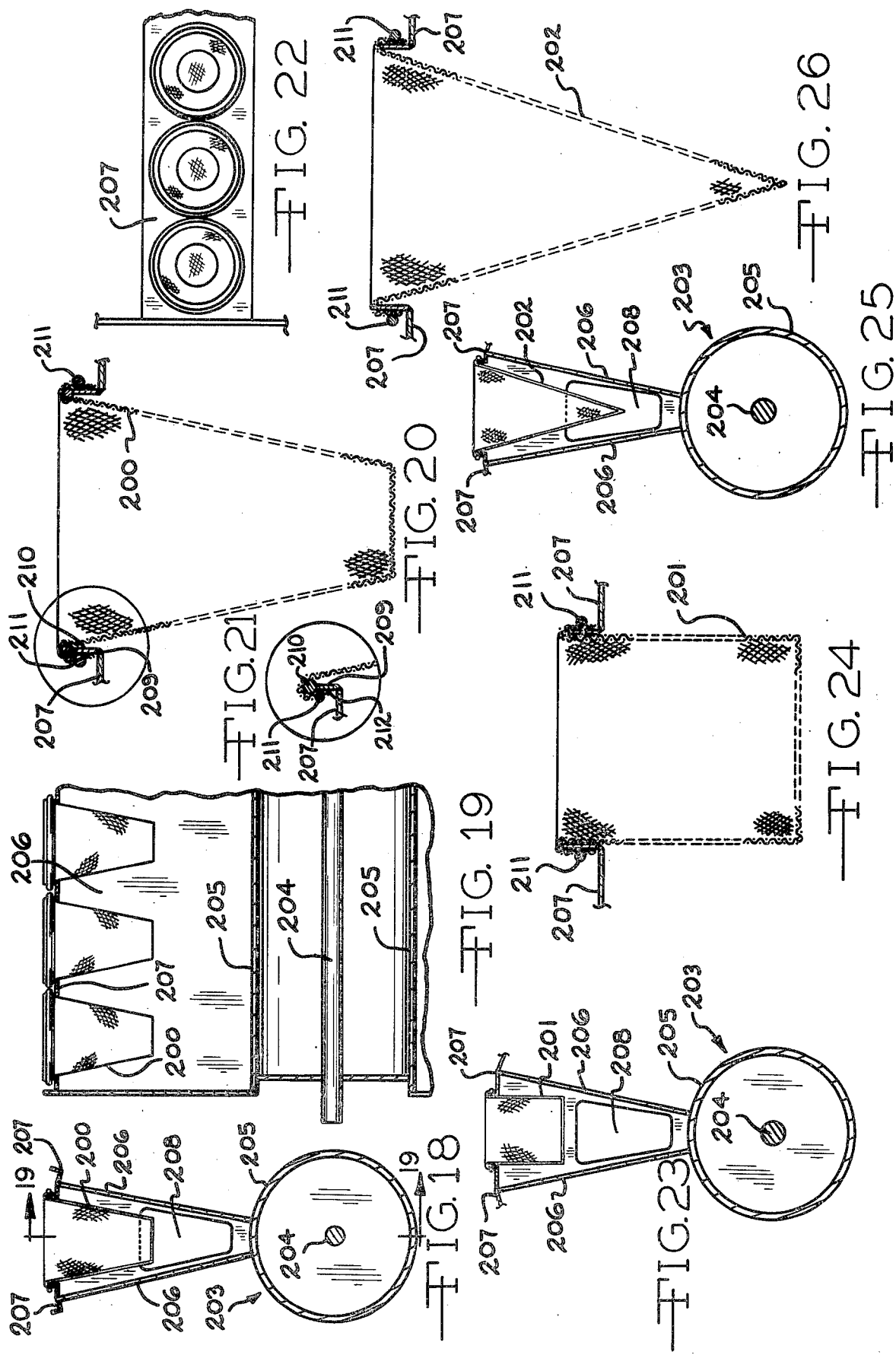

PARTICLE SEPARATOR AND COLLECTOR

CROSS REFERENCE TO RELATED APPLICATION

This application is a continuation-in-part of application Ser. No. 633,552, filed Nov. 19, 1975, now abandoned.

SUMMARY OF INVENTION

The present invention relates to an improved apparatus for particle separation and collection. In particular, the present invention relates to an apparatus which utilizes a novel shutter mechanism for removal of particles from the filter elements.

PRIOR ART

While the present invention has application in diverse industries, it is expected that the most important single application will be in the asphalt mixing plant industry. The following discussion of operation will describe features and functions as applied to an asphalt mixing plant operation.

On asphalt mixing plants, products of combustion, together with superheated water vapor and unavoidably entrained dust, are drawn from the direct fired rotary sand drier. When air pollution codes must be met, the present method of meeting these codes is to pass the drier exit gases through a large filtercloth baghouse containing hundreds and sometimes thousands of small cylindrical bags. These baghouses have a very high initial cost. An elaborate and expensive means of continuously shaking or otherwise cleaning the bags of dust is employed. To avoid overloading the bags with high dust concentration in the drier gas, and to avoid sandblasting (abrading) the bags, separate primary cyclone dust collectors are used ahead of the filtercloth baghouse, or crude knockout chambers are provided in the filtercloth baghouse itself.

In particular, the baghouses have the cylindrical cross-section bags mounted with their axes vertical. There are two conventional modes of operation employed. In one type of operation, the dirty air enters the inside of the bag at a bottom opening. The only bag support is an attaching strap at the top. The top is sewn shut. The bag is held in a distended shape by virtue of having an internal pressure at a higher level that the outside, which is the clean side. The bag is periodically cleaned by isolating the bag from normal air flow which removes the pressure drop across the bag surface and permits the bag to collapse. A means for mechanically shaking the bag at the top by a strap connection is provided, and dust falls out of the bag by gravity. In the second type of operation, the direction of air flow through the bag is opposite. The bag is fitted with a formed wire cage support to prevent collapse. The outside of the bag is at a higher pressure than the interior, which results in the inside of the bag being the clean side. The top end of the bag is open and fitted with a bell-shaped nozzle connected to high pressure air, with clearance around the nozzle for cleaned air to pass. The bottom end of the bag is sewn closed. Periodically, a high pressure pulse of air is injected, which momentarily pressurizes the inside of the bag in a "shock wave" fashion. The sudden expansion of the elastic bag loosens and removes the collected dust cake.

The patent art in gas borne particle separation is represented by U.S. Pat. Nos. 272,474; 1,764,861; 1,814,428; 2,500,747; 2,795,291; 2,823,656; 3,186,389 and 3,395,517. The last patent describes a device wherein cyclone separation is used; however, particle removal is by means of filtering baskets of the second type described above.

The difficulty with these prior art devices is that the construction is such that the incoming particles, which are at a relatively high velocity, rapidly abrade the filter bags and there is a tendency for particles to leak outside the device. Cake removal from the bags is difficult to accomplish.

It is therefore an object of the present invention to provide a dust separator and collector apparatus wherein the filter elements have a relatively long life, wherein the particles do not leak outside the apparatus and wherein cake removal from the filter element is easily accomplished. These and other objects will become increasingly apparent by reference to the following description and to the drawings.

IN THE DRAWINGS

FIG. 3 is an end cross-sectional view along line 3—3 of FIG. 1 of the exit chute from the apparatus, particularly illustrating the flapper valves activated by the weight of the collected particles.

FIG. 4 is a partial end view along line 4—4 of FIG. 1 particularly illustrating the mounting of the drum and the construction of two of the unsupported filter element pockets.

FIG. 5 is a partial cross-sectional view along line 5—5 of FIG. 4, particularly illustrating the drum construction and the direction of the air movement through one of the filter bags.

FIG. 6 is an end view of the device of FIG. 1 along line 6—6 particularly showing openings for clean air removal and a stationary housing opening for introducing outside air which turns the individual filter element pockets inside out.

FIG. 7 is a front cross-sectional view along line 7—7 of FIG. 6, particularly illustrating an air inlet box for admitting air to turn the individual pockets inside out.

Figure 2:
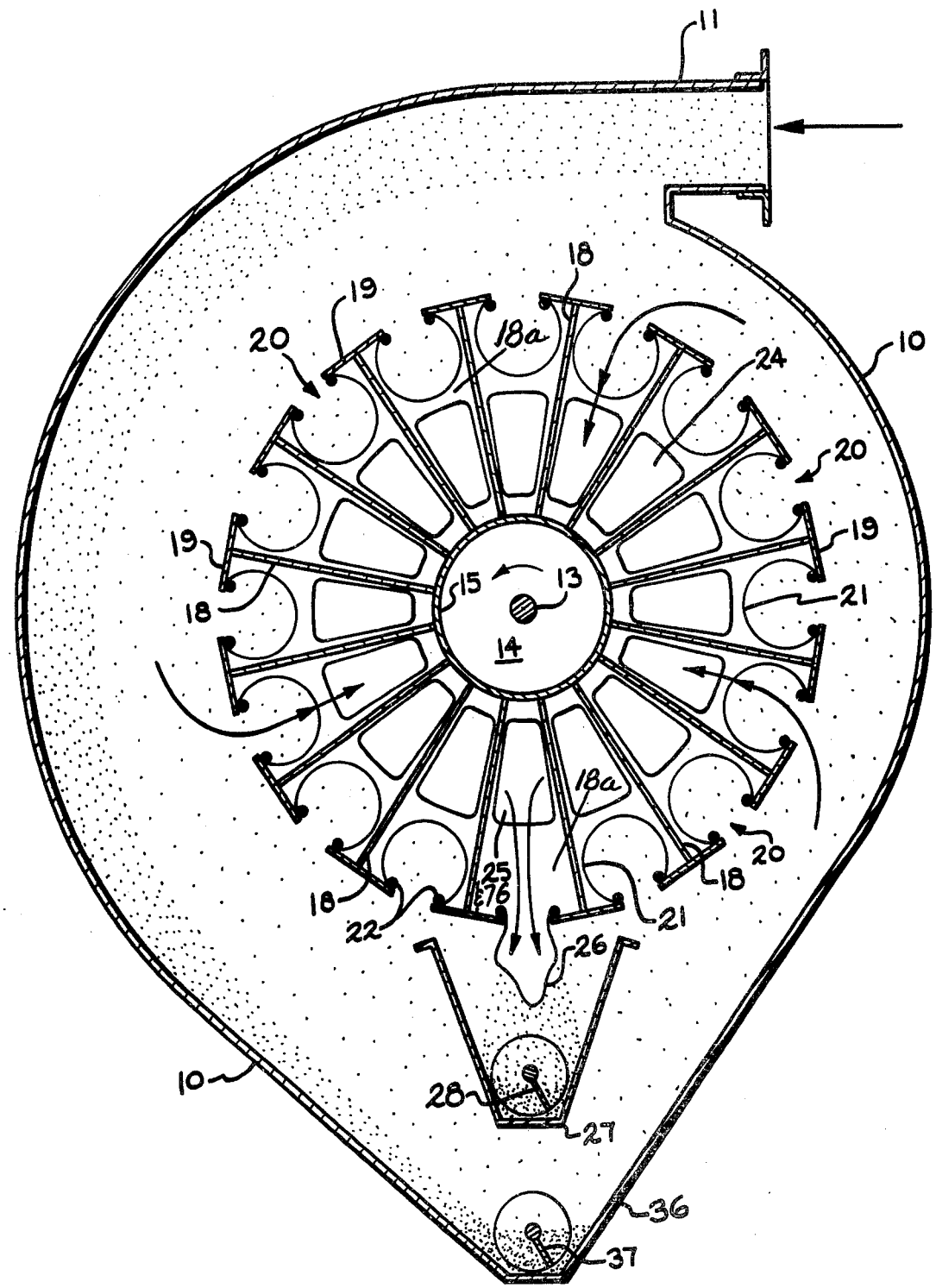
FIG. 2 is an end cross-sectional view along line 2—2 of FIG. 1 particularly illustrating the centrifugal air inlet and a central drum mounting the unsupported pocket filter elements.

FIGS. 9, 10, 11, 12 and 13 show, in plan, side, cross-sectional, enlarged sectional, and partial end sectional views, respectively, the construction of the preferred cylindrical pocket as particularly illustrated in FIG. 2. Section 12—12 of FIG. 10 is shown in FIG. 12. Section 13—13 of FIG. 11 is shown in FIG. 13.

FIGS. 14, 15, 16 and 17 show, in front and three cross-sectional views, respectively, a vertically oriented drum version of the horizontal unit shown in FIGS. 1 to 13. Basically the vertical drum apparatus construction is similar to the horizontal drum apparatus with variations as to the drum drive as shown in FIGS. 16 and 17.

FIGS. 18 to 26 illustrate variations of the filter element pocket and the mounting thereof on a drum which can be used in the present invention. In these variations, the pockets are mounted on a drum as shown in FIGS. 18, 19, 23 and 25, which are partial drum cross-sectional views, and in enlarged cross-sectional views of variations in the pocket shapes in FIGS. 20, 24 and 26. FIG. 22 is a plan view of the mounting of the pockets on a plate provided on the drum.

GENERAL DESCRIPTION

The present invention relates to an improvement in a separator apparatus for the removal of particles from a gas which is introduced into an inlet into a housing for the apparatus, is drawn through and creates a negative pressure in the housing and through an outlet from the housing and of the type which initially provides separation from the inlet gas because of the weight of relatively heavy particles which settle out of the gas in a lower portion of the housing and then provides filtration of the gas through filter elements provided around a cylindrical drum having a longitudinal axis and with end closures on the drum which is rotatably mounted on its longitudinal axis in the housing and with means for rotating the drum such that relatively finer particles not initially separated are retained on the filter elements as the gas flows in a path around the drum and through the filter elements and with removal of cleansed gas from inside the drum to the outlet after passing through the filter elements; the drum having at least three segmented portions between the end closures which are separated from each other around the drum with openings for cleansed gas removal through at least one drum end closure in each segment and wherein the end closure with the openings is in rubbing and sealing relationship with the housing around the outlet from the housing; sheets of a flexible filter material as filter elements blanketing or covering each of the segments around the drum in the form of pockets such that particles can be trapped in the filter elements while cleaned gas passes through the filter elements, moves parallel to the longitudinal axis of the drum through the end closure openings in the drum and through the outlet from the housing; and a second stationary housing opening leading outside the housing adjacent the drum segment end closure openings formed by extended margins in rubbing and sealing contact with the drum end closure and projecting into the outlet perpendicularly to the longitudinal axis of the drum which provides a shutter means so that as the drum rotates at least one end closure opening in an individual segment in the drum is isolated from the outlet for cleansed gas and connects the isolated end closure opening with the second housing opening so as to successively turn the filter element in an individual segment inside out to remove accumulated particles from the filter element by means of gas drawn from outside the housing through the second stationary housing opening and into the individual segment and through the drum closure opening due to the negative pressure of the gas being drawn through the housing until the isolated drum opening rotates past the second housing opening.

The present invention also relates to a preferred filter element for use in the separator apparatus described herein for the removal of particles from a gas and of the type which initially provides separation because of the weight of relatively heavy particles from the inlet gas and then provides filtration of the gas through filter elements provided on a holder in a housing such that relatively finer particles are retained on the elements with removal of the cleansed gas from inside the holder, which comprises: a flexible filter material sheet in the form of a pocket shaped as a cylinder with a section parallel to its longitudinal axis removed, to form a rectangular opening which pocket is of sufficient strength to be unsupported except for mounting of the pocket opening on the holder; and reinforcing means provided around the opening of the pocket for sealing attachment to the holder.

The preferred apparatus provides built-in primary separation by utilizing a basic cyclone type body to centrifuge heavier dust particles to the outer wall. These heavier particles are removed by screw conveyor or other means and thus are removed from the system as the first step in the process. A filter element is attached to a rotating drum, with provision to flex the filter surface once each revolution to break off and remove the dust "cake". This invention thus replaces a large bank of static bags with a relatively small and compact set of dynamic filter elements.

SPECIFIC DESCRIPTION

Figure 1:
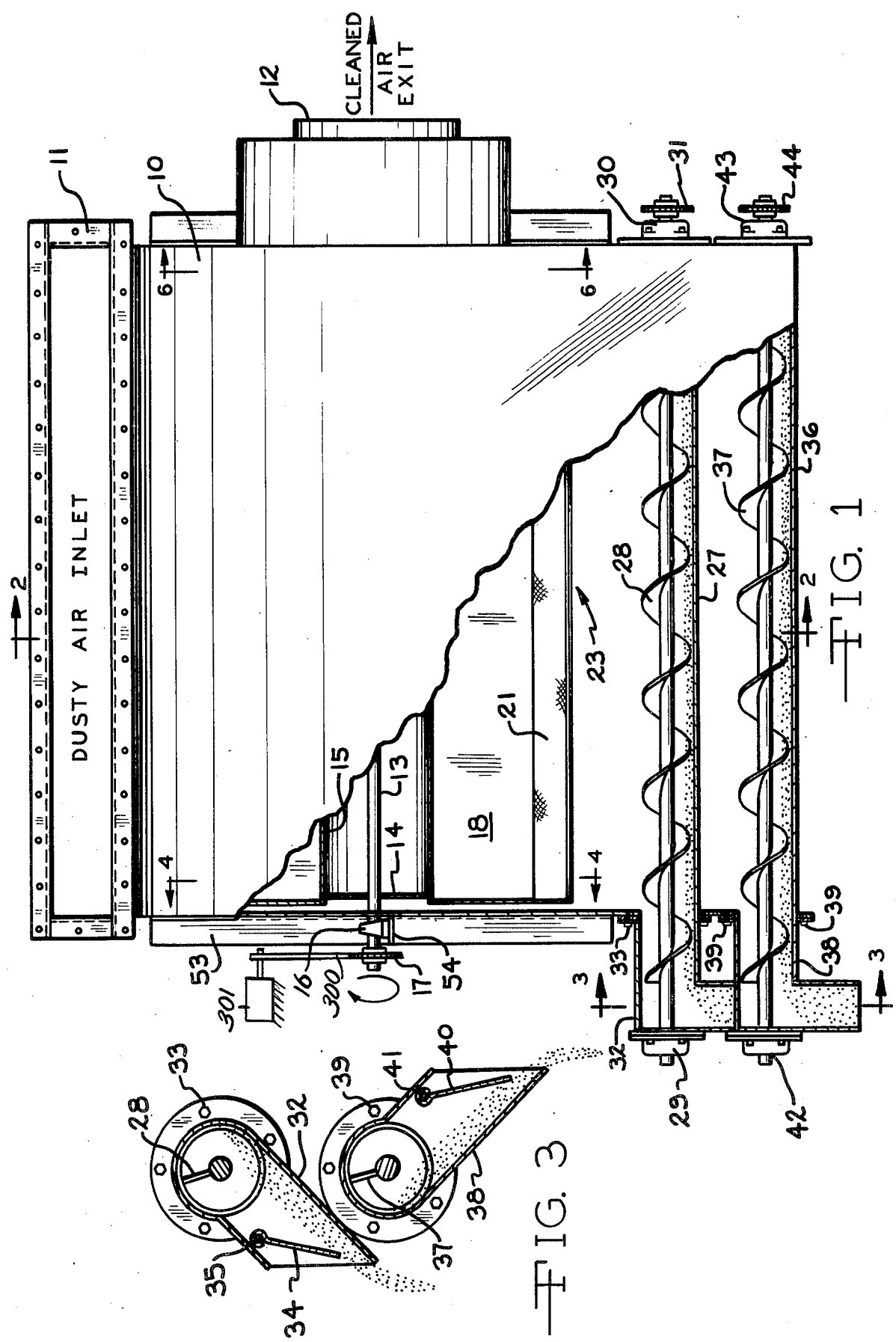
FIG. 1 is a front view of the preferred separator and collector apparatus of the present invention with a partial section removed, particularly illustrating the air inlet and exit conduits.

The preferred horizontal drum version of the apparatus of the present invention is shown in FIGS. 1 to 8. Referring to FIGS. 1 to 3, a housing 10 is provided which is involute in cross-section as shown in FIG. 2 having its longitudinal axis horizontally oriented. At a tangent to the circumference of the housing 10 is provided a gas inlet conduit 11 and at one end and along the longitudinal axis of the housing 10 is provided a clean air outlet conduit 12. Mounted on the longitudinal axis of the housing 10 is a shaft 13 and circular end plates 14 and 70 and a tube or hub 15 such that the shaft 13, plates 14 and 70 and tube 15 form a support which is rotatably mounted (for preferred counterclockwise rotation as shown which is in the direction of inlet air flow) by bearings 16 and 63 (FIG. 7) at both ends of the shaft 13. The shaft 13 is rotated by a gear 17 rotated by a chain 300 and a motor 301. The tube or hub 15 supports sixteen blades 18 which extend radially from the longitudinal axis of the housing 10 along which the shaft 13 is mounted. The arcs between the blades 18 are equal as are the blade lengths as shown in FIGS. 1 and 2 and the blades 18 form partitioned segments 18a around the tube 15. At the radial ends of the blades 18 are mounted flat plates 19 which are perpendicular to the blades 18 so as to provide open slots 20 between adjacent pairs of the blades 18. On the underside of the plates 19 and along the slots 20 are mounted cylindrically shaped pockets 21. As can be seen from FIG. 2, the edges 22 of the pockets 21 are not exposed to the direct abrasive effect of the incoming particles. The details of the construction of the pockets 21 will be described further hereinafter.

As can be seen from FIGS. 1 and 2, blades 18, plates 19 and pockets 21 with the tube 15 mounted on the shaft 13 form a drum 23 which is rotated by gear 17. At one end of the drum 23 is provided openings 24 in each segment 18a as part of a shutter mechanism. These openings 24 lead to the clean air outlet conduit 12. An opening 25 (there may be more than one simultaneously vented and preferably two) at the low point of the drum 23 is vented by means of the shutter mechanism such that the pocket 26 turns inside out. The shutter mechanism is described hereinafter in reference to FIG. 8.

Associated with the reversed pockets 26 is a trough 27 which runs the length of the slot 20 and is parallel to the longitudinal axis of the drum 23. A helical screw 28 is rotatably mounted by means of bearings 29 and 30 in the trough 27. Rotation is accomplished by means of a gear 31 which is rotated by a chain and motor (not shown). The trough 27 picks up the relatively fine particles from the reversed pockets 26. As shown in FIGS. 1 and 3, the screw 28 moves the particles to a chute 32 attached to the housing 10 which mounts a bearing 29. The chute 32 is fixed by means of bolts 33 to the housing 10 and is opened by a flapper valve 34 mounted on a pivot pin 35 which is opened by the weight of the particles. For the coarser particles separated by the centrifugal effect of the involute in cross-section shape of the housing, a second trough 36 is provided with an identically constructed helical screw 37, chute 38, bolts 39, flapper valve 40 and pivot pin 41, bearings 42 and 43 and gear 44. The valves 34 and 40 form a first and second end closing means, respectively. The gears 31 and 44 can be driven together.

FIGS. 4 and 5 show the details of the construction of the end of the housing 10 which supports the gear 17 which is used to rotate the drum 23. In particular, a circular plate 50 with a hole 51 through its center for the shaft 13 is provided to cover one end of the involute in cross-section housing 10. Angle irons 52 and 53 are mounted parallel to each other and on either side of the shaft 13 so as to mount a perpendicular plate 54 which mounts the bearing 16 by means of bolts 55 through the plate 54. The angle irons 52 and 53 extend beyond the circumference of the plate 50 and are affixed to the housing 10 by means of bolts 56. Suitable ring seal means (not shown) can be provided between the housing 10 and circular plate 50.

FIGS. 4, 5, 6 and 7 show the details of the mounting of the pockets 21 on the plates 19. The pocket 21 edges 22 are pressed onto the underside of the plate 19 by means of pipes 57 running the length of the slot 20. At the driven gear 17 end of the drum is provided a circular plate 58 which extends the length of the blades 18 so as to close this end of the drum 23. Affixed to the circumference of the plate 58 between the slots 20 are bridge plates 59 for holding the end edges of the pockets 21. A pipe 61 and the plate 59 compress the end of the pockets 21 to close the pockets. The pipes 57 and 61 are held in position by means of bolts 62 which go through the plates 19 and bridge plates 59 and into threaded holes (not shown) in the pipes 57 and 61. Both ends of the drum are identical in relation to the mounting of the pockets 21 and thus the same numbers are used in the Figures.

Figure 8:
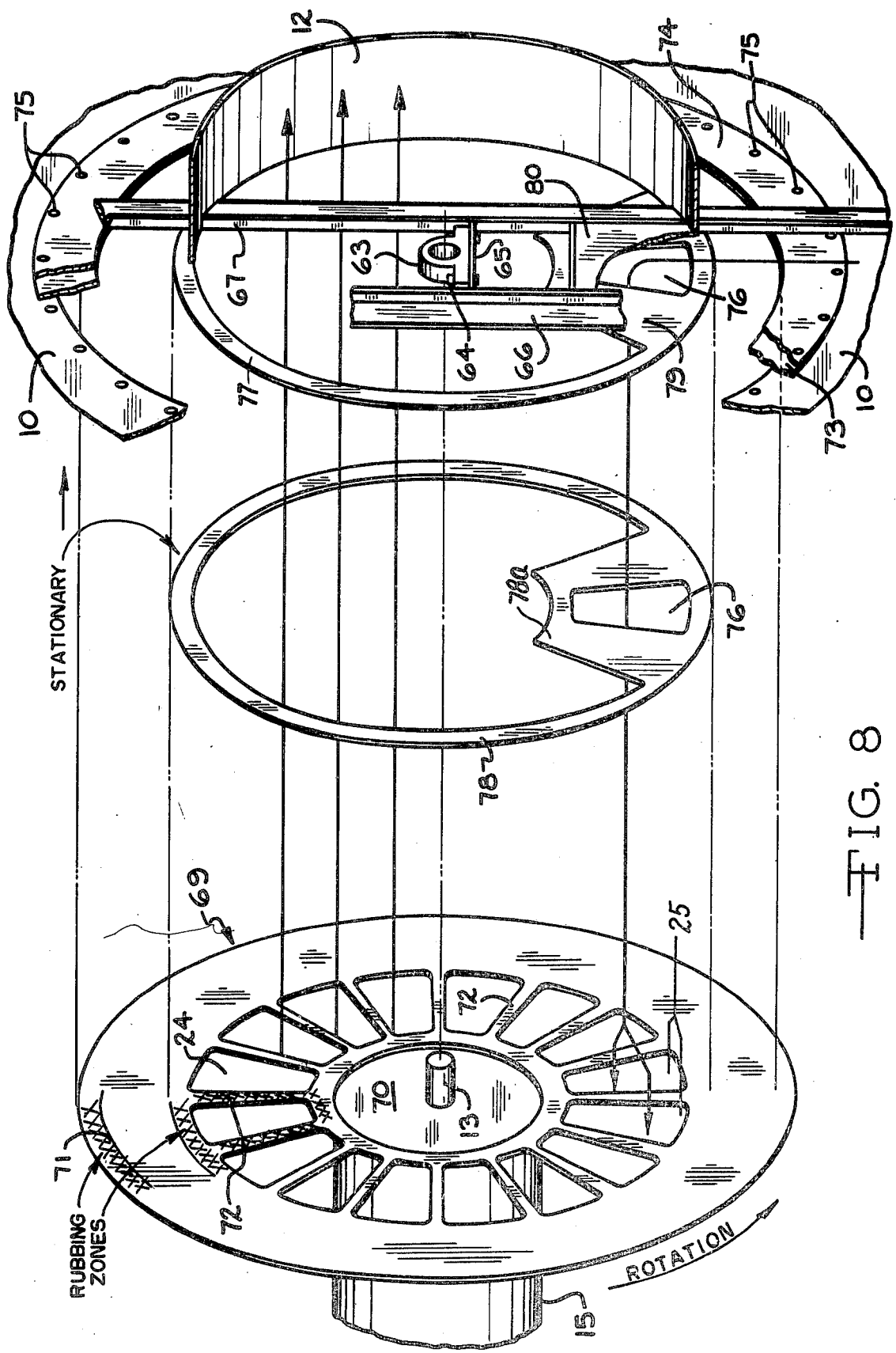
FIG. 8 is a separated front exploded oblique projection of a shutter mechanism which permits outside air entry to turn the pockets inside out and which also allows for clean air removal from inside of the drum.

FIGS. 6, 7 and 8 show the details of the construction of the shutter mechanism leading to the clean air conduit 12. As with the opposite end of the housing 10, a bearing 63 is mounted by means of bolts 64 to a plate 65 mounted perpendicularly between two spaced apart angle irons 66 and 67. This end of the shaft 13 is thus mounted on the housing 10 by means of the angle irons 66 and 67 which are attached to the housing 10 by means of bolts 68.

FIGS. 6, 7 and 8 show the details of the shutter apparatus for air exit through openings 24 and air inlet through the opening 25 and 76 for turning the pockets 21, as shown by number 26, inside out. The end of the drum 23 is fitted with a circular plate 69 which is affixed to the tube 15 which has an end plate 70 corresponding to plate 14 which supports the shaft 13. The circular plate 69 is larger in diameter than the tube 15 and has an annular face (or area) 71 which is in closely spaced relation to the end 85 (FIG. 9) of the pockets 21. Inside the annular ring 71 are the trapezoidal-shaped openings 24 in each segment 18a which allow clean air to exit from the drum 23. The openings 24 are spaced apart around the plate 69 and are slightly smaller in arc dimension than the segmented space between the blades 18 and are formed on the sides by divider margins 72.

The outer margin of the annular face 71 bears against a non-rotating ring seal 73, made of asbestos or a similar material which is held in position by means of retainer ring 74 secured to the housing 10 by means of bolts 75. A second smaller diameter annular ring 77 is provided inside of and in the same vertical plane as the retainer ring 74. The ring 77 is mounted on the angle irons 66 and 67. The annular ring 77 contains a single opening 76 with extended margins 79 projecting into the outlet conduit 12 perpendicular to the longitudinal axis of the tube 15 and shaft 13 at the lowest point of the drum 23. The preferred width of the opening 76 and extended margins 79 is such as to place two or more pockets 26 in the cleaning cycle at any given moment in time. The ring 77 has a conforming seal 78 mounted in fixed or stationary position on it and made of asbestos or a similar material. The opening 76 is in the rotational line of sight with the openings 24 on the drum 23. The air outlet circuit 12 is provided with a box 80 around the opening 76 to isolate the opening 76 from the outlet conduit 12. As can be seen from FIG. 8, the angle irons 66 and 67 also function to hold the outlet conduit 12 in position.

FIGS. 9 to 13 show the details of construction of the preferred cylindrical shaped pockets 21. The pocket 21 has a portion parallel to its longitudinal axis removed to form a slot 81. The margins 82 of the slot 81 are provided with regularly spaced apart holes 83. As shown in FIG. 12 the margins 82 of the pocket are folded under and sewn around the holes 83. The ends of the pockets 21 are provided with a sewn on end 85 which can be filter material or can be a more abrasion resistant non-filtering material.

In operation of the unit shown in FIGS. 1 to 13, the outlet conduit 12 is connected to the suction side of an induced draft fan (not shown) to create a pressure drop across the unit and thus cause a flow of gases through the apparatus. This produces a negative pressure in the housing 10 which is loosely sealed from the atmosphere and has a pressure in the operating range of one to four inches of water column as a negative static pressure. Dust laden gas enters the inlet conduit 11 tangential to the housing 10 which has a cyclonic type action. Heavier particles are centrifuged and fall to the trough 36 and are moved by screw 37 through chute 38 and flapper valve 40. Finer dust particles as they move around the drum 23 are drawn into the pockets 21 and form a cake on the surface which acts as a filter aid. The plates 19 and the tubes 57 and 61 prevent abrasion of the margins 82 of the pockets 21 by the particles. The clean air passes along the blades 18 in each segment 18a, through the openings 24 in the circular plate 69 and out the conduit 12.

At the trough 27, the pockets 26 turn inside out as the drum rotates. This is because atmospheric air is drawn through the box 80 and opening 76 and through one or two apertures 25 which are adjacent the opening 76. This causes the pocket 26 to turn inside out and unload the accumulated particles into the trough 27. The helical screw 28, then removes the relatively finer particles through chute 32 by opening the flapper valve 34 on pin 35.

Only the item including circular plate 69 shown at the left of FIG. 8, rotates. All other shutter parts shown are stationary. The asbestos type seal 78 with a conforming extended margin 78a is fastened to ring 77 by means not shown. It could be cemented, but some bolting method which recesses the bolts can be used. Air leakage at the rotating surfaces of the shutter is prevented by use of the seal 78 in rubbing contact with plate 69. The margins 79 of the ring 77 are sufficiently extended adjacent to hole 76 to cause total blockoff of the compartments being cleaned to all connection except that of outside cleaning air. Seal plate 74 with gasket 73 in rubbing contact with plate 69 separates the housing 10 chamber from outside air. Seal ring 77 with seal 78 separates the segments 18a containing the pockets 26 being cleaned from fan suction pressure. The shutter end of the drum 23 is designed to radially mate with two widely separated sealing surfaces so as to effectively prevent any possible internal leakage within the housing 10. At opening 76 shown in FIG. 8 this separation permits outside direct sight of segments 18a between adjacent blades 18.

In the relative position of the drum 23 shown in FIG. 8, the lowest two segments 18a on the drum 23 are shown as being connected to outside air through stationary opening 76. The extended margin construction of ring 77 is necessary to accomplish the objective that outside air must be connected only to pockets 26 which have been sealed to all other air connections, and that outside air must not be permitted a path joining cleaned air to the fan at the moment an approaching pocket 21 opening begins to move into the opening 76. By careful dimensioning of extended margins one can also assure that a shutter opening 24 is reconnected to the fan suction only after it leaves communication with the stationary opening 76.

FIGS. 14 to 17 show a version of the apparatus of the present invention wherein the drum 100 rotates on a vertical shaft 101 in a involute in cross-section housing 102 which is provided with a conical collector bottom end portion 103 leading to a chute 104 with flapper valve 105 attached to the chute 104 by means of a pivot pin 106. The particle laden gas is introduced through inlet conduit 107 at the circumference of the housing 102.

The drum 100 and construction is substantially identical to that shown in FIGS. 1 to 13. In particular, as shown in FIG. 15, a tube or hub 108 is mounted on the shaft 101 for rotation and has radial blades 109 of equal length with perpendicular flat end plates 110. Pockets 111 are mounted on the underside of and between each two plates 110 such that they blanket the area between the blades 109. In this case the longitudinal axes of the pockets 111 are vertically oriented.

A shutter mechanism formed of an annular ring 112 with openings 113 is provided at the top of the drum 100 so that the clean air can be vented through outlet conduit 114. Sealed thrust bearing 116 and radial bearing 115 on the top and bottom of outlet conduit 114 support and stabilize the shaft 101. At the end of the shaft 101 is mounted sprocket 122 which is driven by a motor 302. The conduit 114 is supported by channel beams 117 and 118 as shown in FIGS. 16 and 17.

A box 119 is provided adjacent the shutter mechanism 112 for providing outside air to reverse the pocket 120. A trough 121 is mounted adjacent the reversed pocket 120 so as to direct the particles to the bottom conical portion 103 of the housing 102.

In operation, the apparatus shown in FIGS. 14 to 17 functions in a very similar manner to that of FIGS. 1 to 13, except that particle removal is by gravity rather than by the helical screw 28 or 37 shown in FIGS. 1 and 2.

FIGS. 18 to 26 show pocket variations which can be used in the apparatus of the present invention. FIGS. 18, 19, 20, 21 and 22 show a pocket 200 which is in the shape of a truncated cone. FIGS. 23 and 24 show a pocket 201 in the form of a cylinder. There can be multiple cup shaped pockets on a support plate which is positioned in each segment between two adjacent blades forming the segment as shown in FIGS. 19 and 22. FIGS. 25 and 26 show a pocket 202 in the form of a cone. The pockets 200, 201, or 202 are mounted on a drum 203, shown in part in FIGS. 18, 23 and 25, which includes a shaft 204, attached to a hub 205 and between blades 206 which extend from the hub 205 in a radial direction from the longitudinal axis of the shaft 204. Mounting plates 207 for pockets 200, 201 or 202 are provided at the ends of the blades 206. A shutter mechanism is provided, as previously described, in connection with an opening 208 at one end of the drum 203. The end plate 207 has closely spaced apart circular openings formed by annular rings 209 which are terminated by rounded lips 210 larger in diameter than the ring 209 as particularly shown in FIG. 21. An elastic snap ring 211 slips over the lip 210 on a turned over margin 212 of the pocket 200, 201 or 202. As can be seen the pockets 200, 201 and 202 all function as cups which collect particles on the inside.

The preferred apparatus of the present invention shown in FIGS. 1 to 17 provides a unitized dust separator and collector which will meet strict air pollution codes. There is a preliminary removal of heavier dust particles by centrifuging prior to filtering gas through the filter surface. This both protects the filter surface from sandblasting effect and simultaneously reduces dust loading. A relatively small inexpensive, and easily serviced fabric filter element is used in a dynamic way to positively purge collected dust, and rapidly recycle a clean filter surface back into the gas stream. The thickness of dust on the filter element and associated pressure drop can be controlled by a variable speed drive on the drum to control cleaning cycle frequency. There is a capability of a rough classification of collected dust into coarse and fine fractions. Finally, potential accidental dust leakage to atmosphere is avoided by providing clean gas sides at potential leakage points to be at higher static pressure than the adjoining dirty gas sides.

In general, the separator housing can have other configurations besides the preferred involute in cross-section shape so long as they initially provide some separation of the relatively heavy particles from the inlet gas because of their weight; however, the involute in cross-section shape is preferred since it provides centrifugal separation of the heavier particles. The flow path of the particle laden gas should be substantially around the circumference of a generally involute in cross-section shaped drum and can be provided by a pressurized particle laden gas upstream; however, this is not preferred since the seals would tend to leak.

A tube or hub of any shape is used to mount blades which extend radially of the longitudinal axis of the hub. There are at least three such blades and preferably between 12 and 30 with pockets between each of two blades. Other means can be used to turn the pockets inside out as are known to the prior art; however, the shutter mechanism utilizing outside air is greatly preferred for simplicity of operation. The pockets should be composed of flexible strands of a polymer having a high flex life, as is known to the prior art, such as a product trademarked Teflon (tetrafluoroethylene polymer) or a product trademarked Nomex (aromatic polyamide) and can be a woven fabric.

I claim:

1. In a separator apparatus for the removal of particles from a gas which is introduced into an inlet in a housing for the apparatus, the gas is drawn through and creates a negative pressure in the housing as it is drawn through filter elements and is removed through an outlet from the housing and specifically of the type which initially provides separation from the gas introduced at the inlet because of the weight of relatively heavy particles which settle out in a lower portion of the housing and then provides filtration of the gas through the filter elements provided around a cylindrical drum having end closures and with means for rotating the drum which is rotatably mounted on its longitudinal axis between the end closures in the housing such that relatively finer particles not initially separated are retained on the filter elements as the gas flows in a flow path around the drum and through the filter elements and with removal of cleansed gas from inside the drum to and through the outlet after passing through the filter elements, the improvement which comprises:

(a) as part of the drum, a hub having a longitudinal axis such that the drum is rotatably supported by the hub longitudinal axis in the housing in the flow path of the gas and which path is around the longitudinal axis of the hub;

(b) at least three blades extending radially from the hub so as to form along with two end plates forming the drum end closures partitioned segments around the hub and which segments have openings through at least one end plate leading to the outlet from the housing for removal of the cleansed gas and wherein the end plate with the openings is in rubbing and sealing relationship with the housing around the outlet from the housing;

(c) sheets of a flexible filter material forming the filter elements positioned on the segments around the drum in the form of pockets which are unsupported except for mounting of edges of the pockets on the segments by attachment means between the blades, whereby particles moving in the flow path are trapped in the filter elements while cleansed gas passes through the filter elements, moves parallel to the longitudinal axis of the hub and then out the openings in the end plate and through the outlet from the housing; and (d) a stationary housing opening leading outside the housing adjacent the end plate with the openings with extended margins in rubbing and sealing contact with the end plate with the openings and projecting into the outlet perpendicularly to the longitudinal axis of the hub and isolated from the outlet by a stationary box around the extended margins and housing opening which provides a shutter means, the box communicating with a source of gas outside of the housing, so that as the drum rotates at least one end plate opening in an individual segment in the drum is isolated from the outlet for the cleansed gas by the extended margins and the box and connects with the stationary housing opening so as to successively turn the filter element in an individual segment inside out to remove accumulated particles from the filter element as the drum rotates by means of gas drawn from outside the housing through the stationary housing opening and into the individual segment through the end plate opening due to the negative pressure of the gas being drawn through the housing until the isolated end plate opening rotates past the housing opening.

2. The apparatus of claim 1 wherein the drum is mounted in spaced relation to the housing which is involute shaped and wherein the gas flow path at the inlet is tangential around the housing to provide centrifugal separation of the heavier particles so that they settle out in the lower portion of the housing.

3. The apparatus of claim 1 wherein a central conduit is provided as the outlet from the housing adjacent the openings in the end plate of the drum for the exit of the cleansed gas from the openings in the end plate which end plate around and outward from the openings is in sealing and rubbing contact with a seal between the drum end plate and a wall of the housing such that the negative pressure created by the gas drawn through the housing prevents the escape of particles in the gas inside the housing to outside of the housing from between the end plate and the housing.

4. The apparatus of claim 1 wherein there are between 12 and 30 blades extending radially from the hub.

5. The apparatus of claim 1 wherein the longitudinal axis of the hub of the drum is horizontal and wherein below the drum a first helical screw is mounted horizontally at the lower portion of the housing in a trough in the housing for movement and removal of separated heavier particles through an outlet chute with a closing means at one end of the screw on the outlet chute for maintaining the housing in a gas sealed condition.

6. The apparatus of claim 5 wherein a second helical screw is mounted horizontally inside the housing in a trough below and adjacent to the drum with an outlet chute at one end of the housing for movement and removal of particles separated by the filter elements above the first screw and wherein the filter elements turn inside out above the lower portion of the housing over the trough for the second screw and wherein a closing means is provided at one end of the second screw on the outlet chute.

7. The apparatus of claim 1 wherein the filter material sheets forming the filter elements are composed of woven strands of a polymer having a high flex life and the filter elements are in the form of cylinders each having a longitudinal axis which is mounted parallel to the longitudinal axis of the hub and with a slotted opening in the filter element which is parallel to the filter element longitudinal axis and wherein the filter element is mounted in each drum segment around the slotted opening.

8. The apparatus of claim 1 wherein the filter elements are multiple cup shaped pockets mounted on a support plate which plate is positioned in each segment between two adjacent blades forming the segment.

9. The apparatus of claim 8 wherein the pockets are in the form of a cone.

10. The apparatus of claim 9 wherein the form of the cone is truncated.

11. The apparatus of claim 1 wherein the extended margins of the stationary housing opening cause a total blockoff of two isolated individual end plate openings as the drum rotates.

12. In a separator apparatus for the removal of particles from a gas which is introduced into an inlet into a housing for the apparatus, is drawn through and creates a negative pressure in the housing and through an outlet from the housing and specifically of the type which initially provides separation from the gas introduced at the inlet because of the weight of relatively heavy particles which settle out of the gas in a lower portion of the housing and then provides filtration of the gas through filter elements provided around a cylindrical drum having a longitudinal axis and with end closures on the drum which is rotatably mounted on its longitudinal axis in the housing and with means for rotating the drum such that relatively finer particles not initially separated are retained on the filter elements as the gas flows in a path around the drum and through the filter elements and with removal of cleansed gas from inside the drum to the outlet after passing through the filter elements, the improvement which comprises:

(a) the drum having at least three segmented portions between the end closures which are separated from each other around the drum with openings for cleansed gas removal through at least one drum end closure in each segment and wherein the end closure with the openings is in rubbing and sealing relationship with the housing around the outlet from the housing;

(b) sheets of a flexible filter material forming the filter elements covering each of the segments around the drum in the form of pockets such that particles can be trapped in the filter elements while cleaned gas passes through the filter elements, moves parallel to the longitudinal axis of the drum and through the end closure openings in the drum and through the outlet from the housing; and (c) a stationary housing opening leading outside the housing adjacent the end closure with the openings with extended margins in rubbing and sealing contact with the end closure with the openings and projecting into the outlet perpendicularly to the longitudinal axis of the drum and isolated from the outlet by a stationary box around the extended margins and housing opening which provides a shutter means, the box communicating with a source of gas outside the housing, so that as the drum rotates at least one end closure opening in an individual segment in the drum is isolated from the outlet for the cleansed gas by the extended margins and the box and connects the isolated end closure opening with the housing opening so as to successively turn the filter element in an individual segment inside out to remove accumulated particles from the filter element by means of gas drawn from outside the housing through the stationary housing opening and into the individual segment and through the end closure opening due to the negative pressure of the gas being drawn through the housing until the isolated opening end closure rotates past the housing opening.

13. The apparatus of claim 12 wherein the extended margins of the stationary housing opening cause a total blockoff of two isolated individual end closure openings as the drum rotates.

* * * * *